(12) United States Patent
Jones et al.

(10) Patent No.: US 9,372,351 B1
(45) Date of Patent: Jun. 21, 2016

(54) CIRCUITS FOR ACTIVE EYEWEAR

(75) Inventors: Theron Lee Jones, White Heath, IL (US); Richard Dean Davis, Champaign, IL (US)

(73) Assignee: Maxim Integrated Products, Inc., San Jose, CA (US)

( * ) Notice: Subject to any disclaimer, the term of this patent is extended or adjusted under 35 U.S.C. 154(b) by 1039 days.

(21) Appl. No.: 13/485,888

(22) Filed: May 31, 2012

(51) Int. Cl.
| | |
|---|---|
| *H04B 10/06* | (2006.01) |
| *H04J 14/08* | (2006.01) |
| *G09G 5/00* | (2006.01) |
| *G02B 27/22* | (2006.01) |
| *H04N 13/00* | (2006.01) |

(52) U.S. Cl.
CPC ........ *G02B 27/2264* (2013.01); *H04N 13/0048* (2013.01)

(58) Field of Classification Search
CPC ........... H04B 10/1141; G02B 27/2264; G03B 35/16; G09G 2310/08; H04N 13/0438; H04N 13/0497
USPC ......... 398/107, 110, 106, 202–204, 207–208, 398/212; 381/381; 345/419
See application file for complete search history.

(56) References Cited

U.S. PATENT DOCUMENTS

| | | | | |
|---|---|---|---|---|
| 4,532,481 A * | 7/1985 | Meza | ...................... | H03F 3/343 330/288 |
| 4,550,262 A * | 10/1985 | Kohsiek | .................. | H03F 3/343 323/315 |
| 4,574,270 A * | 3/1986 | van de Plassche | .... | H03M 1/445 341/135 |
| 4,766,295 A * | 8/1988 | Davis | ...................... | A47F 10/02 235/383 |
| 4,807,031 A * | 2/1989 | Broughton | ............. | A63H 30/04 348/460 |
| 4,878,031 A * | 10/1989 | Main | ........................ | H03G 3/00 330/254 |
| 5,339,020 A * | 8/1994 | Siligoni | .................. | G05F 3/222 323/281 |
| 5,432,477 A * | 7/1995 | Nishiyama | ........... | H03G 1/0023 327/563 |
| 5,498,952 A * | 3/1996 | Ryat | ....................... | G05F 3/265 323/312 |
| 5,557,238 A * | 9/1996 | Weiss | ....................... | H03F 3/26 330/258 |
| 5,644,217 A * | 7/1997 | Kusaba | ................... | G05F 3/222 323/315 |
| 5,811,867 A * | 9/1998 | Yamamoto | .......... | H01L 27/1443 257/458 |
| 5,821,989 A * | 10/1998 | Lazzaro | ................. | G03B 21/30 348/53 |
| 5,900,720 A * | 5/1999 | Kallman | ................. | G02F 1/163 320/103 |
| 6,057,811 A * | 5/2000 | Edwards | ............ | G02B 27/2264 345/8 |
| 6,252,624 B1 * | 6/2001 | Yuasa | ................ | G02B 27/2264 348/56 |
| 6,801,084 B2 * | 10/2004 | Smith | ................... | H03F 3/3432 330/310 |

(Continued)

*Primary Examiner* — Ken N Vanderpuye
*Assistant Examiner* — Abbas H Alagheband
(74) *Attorney, Agent, or Firm* — TIPS Group

(57) ABSTRACT

A circuit includes a front-end circuit, a receiver stage and a controller. An example front-end circuit includes a common base input device, a first current mirror and a second current mirror, where the common base input device has its emitter coupled to a photodiode, its collector coupled to an input of the first current mirror, and its base coupled to a reference voltage to reverse bias the photodiode and where an output of the first current mirror is input into the second current mirror. In another example, a voltage drop resistor is coupled to a cancellation signal output of the first current mirror and an operational transimpedance amplifier (OTA) has inputs coupled to the voltage drop resistor and to a reference voltage and an output coupled to a compensating impedance and to a control input of a variable current source designed to feed the emitter signal input.

19 Claims, 2 Drawing Sheets

(56) References Cited

U.S. PATENT DOCUMENTS

| | | | | |
|---|---|---|---|---|
| 7,265,333 B2* | 9/2007 | Ichino | ............... | H01L 31/02027 250/214 A |
| 8,526,832 B2* | 9/2013 | Rotzoll | ............. | H04N 13/0438 398/207 |
| 2001/0043266 A1* | 11/2001 | Robinson | ........... | G02B 27/2264 348/53 |
| 2003/0087626 A1* | 5/2003 | Prikhodko | .............. | H03F 1/302 455/341 |
| 2003/0231059 A1* | 12/2003 | Takemura | ............ | H03G 1/0023 330/254 |
| 2005/0003786 A1* | 1/2005 | Inoue | .................. | H03G 3/3084 455/263 |
| 2005/0052246 A1* | 3/2005 | Visocchi | ................... | H03F 3/08 330/308 |
| 2005/0218994 A1* | 10/2005 | Guckenberger | .......... | H03F 3/08 330/308 |
| 2006/0027736 A1* | 2/2006 | Ichino | ............... | H01L 31/02027 250/214 R |
| 2007/0139616 A1* | 6/2007 | DeCusatis | ............. | G03B 21/14 353/7 |
| 2007/0139617 A1* | 6/2007 | DeCusatis | ............. | G03B 21/00 353/7 |
| 2007/0139618 A1* | 6/2007 | DeCusatis | ............. | G03B 21/14 353/7 |
| 2007/0139619 A1* | 6/2007 | DeCusatis | ............. | G03B 21/00 353/7 |
| 2007/0139624 A1* | 6/2007 | DeCusatis | ................ | G03B 9/10 353/84 |
| 2007/0266123 A1* | 11/2007 | Johannesson | ........ | H04N 21/443 709/220 |
| 2010/0309535 A1* | 12/2010 | Landowski | ........ | G02B 27/2264 359/107 |
| 2011/0007136 A1* | 1/2011 | Miura | ................ | H04N 13/0018 348/46 |
| 2011/0122127 A1* | 5/2011 | Ko | ..................... | H04N 13/0029 345/419 |
| 2011/0242275 A1* | 10/2011 | MacNaughton | ... | H04N 13/0438 348/42 |
| 2011/0316847 A1* | 12/2011 | Cheng | ................ | G02B 27/2264 345/419 |
| 2012/0113335 A1* | 5/2012 | Rotzoll | .............. | H04N 13/0438 349/13 |
| 2013/0002654 A1* | 1/2013 | Yeh | ..................... | H04N 13/0497 345/419 |
| 2013/0033587 A1* | 2/2013 | Kase | .................. | G02B 27/2264 348/55 |
| 2013/0089335 A1* | 4/2013 | Gorny | ................. | H04B 10/114 398/106 |
| 2013/0263048 A1* | 10/2013 | Shimizu | ............. | G06F 3/0482 715/802 |

* cited by examiner

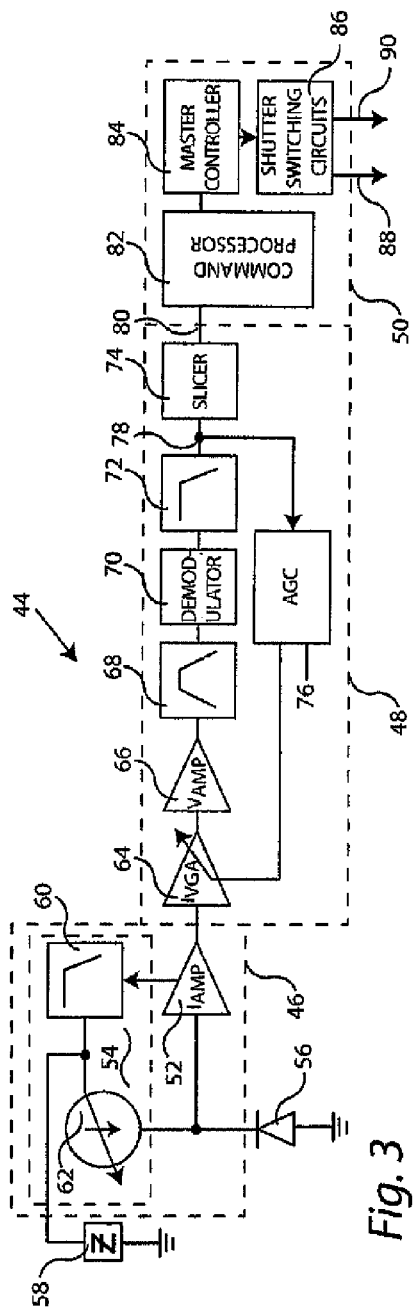
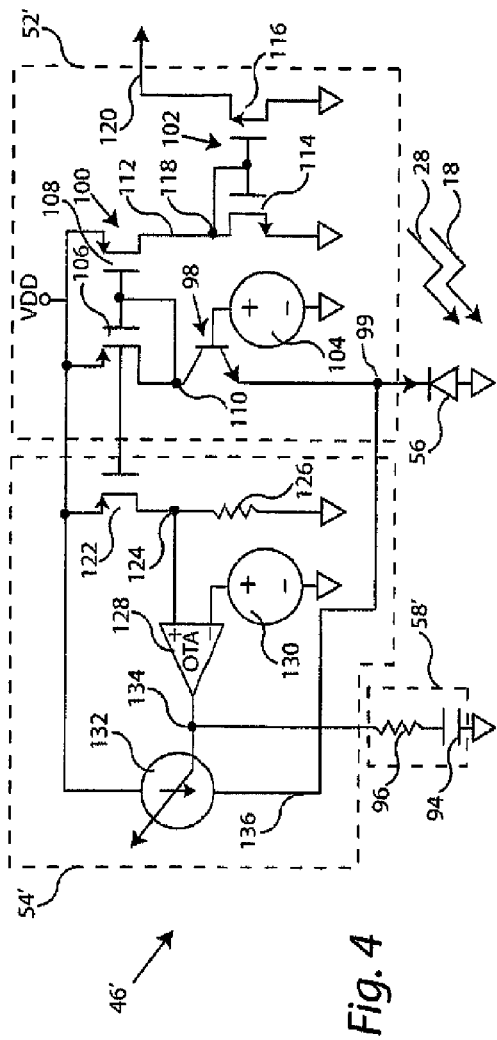

CIRCUITS FOR ACTIVE EYEWEAR

CROSS REFERENCE TO RELATED APPLICATION(S)

This application is related to U.S. Ser. No. 13/485,906, which was filed May 31, 2012 and is now U.S. Pat. No. 8,948,611, entitled "I/R Receiver with Duty Cycle Synchronized Power Reduction", incorporated herein by reference.

BACKGROUND

Active eyewear (sometimes referred to as 3D active eyewear, liquid crystal shutter (LCS) glasses, etc.) is eyewear used in conjunction with a display screen (e.g. of a television or computer monitor) to create the illusion of a three dimension image. The right and left lenses of active eyewear are controlled separately to alternate between being transparent ("open") and dark ("closed"). With LCS glasses, each lens includes a liquid crystal layer ("shutter") that is normally transparent but which becomes dark when a voltage from a shutter switching signal is applied.

Active eyewear can be controlled to alternately darken lenses in synchronization with the frame refresh rate of a screen which alternates between frame images taken from different perspectives. This technique is referred to as alternate-frame sequencing, which achieves the desired stereoscopic effect by having each eye see only the image that was intended for it. The synchronization between the active eyewear and the display screen is often achieved wirelessly, e.g. via infrared (I/R) transmission from an I/R transmitter associated with the display screen to an I/R receiver of the active eyewear.

FIG. 1 illustrates an alternate-frame sequencing system 10 in accordance with the prior art. A display screen 12, such as of a 3D television set (3D-TV) 14, has an I/R transmitter 16 which transmits an I/R synchronization signal 18 in response to a SYNC signal generated by the 3D-TV. Active eyewear 20, having a left lens 22 and a right lens 24, is provided with one or more I/R photodiodes 26 that are sensitive to the I/R synchronization signal 18. The photodiodes 26 are also sensitive to I/R interference 28 created by, for example, sunlight 30, incandescent light 32 and fluorescent light 34.

FIG. 2 illustrates an example I/R synchronization signal of the prior art. In this example, the I/R synchronization signal includes a series of encoded commands such as OPEN LEFT, CLOSE LEFT, OPEN RIGHT, CLOSE RIGHT, referring to the opening and closing of the left and right lenses, respectively, of the active eyewear 20. These commands are generally modulated to provide one or more pulses which encode the commands, e.g. the OPEN LEFT command 36 could include one pulse, the CLOSE LEFT command 38 could include two pulses, OPEN RIGHT command 40 could include three pulses, and the CLOSE RIGHT command 42 could include four pulses. By way of example, the pulse width of the base band signal may be a few hundred microseconds, and it may be chopped with a square wave carrier having a chop rate that is, for example, a about an order of magnitude less.

It should be noted the illustration of FIG. 2 is not to scale. For example, the duty cycle of the commands is generally 10% or less than the command cycle.

Unfortunately, there is not currently a generally accepted standard format for I/R synchronization signals 18. Therefore, while the I/R synchronization signal of FIG. 2 can be used to generically describe I/R synchronization signals of the prior art, it will be appreciated that different manufacturers may have differ timing between commands, send commands at different rates, or may encode the commands differently.

Typically, the active eyewear circuitry for controlling the lenses 22 and 24 is provided in the frame of the active eyewear 20. Also provided in the frame would be the one or more I/R photodiodes 26, a power supply (e.g. batteries), and perhaps an on/off switch.

The active eyewear circuitry of the prior art typically uses a transimpedance amplifier (TIA) as a low-noise front-end circuit to convert the current signal from the I/R photodiode(s) 26 to a voltage signal. Negative feedback of the TIA lowers the input impedance to increase bandwidth in compensation for the inherently large capacitances of photodiodes. A subsequent voltage-to-current converter is then typically needed convert the output voltage of the TIA to a current that can be input into a variable gain current amplifier.

It will be appreciated that the TIA system is relatively complex, utilizes a number of components, and consumes a considerable amount of power. This can be problematical in that the active eyewear circuitry is typically powered by small batteries provided in the frames of the active eyewear 20 and the high current drain of the TIA and associated circuitry will reduce the amount of time that the active eyewear 20 can be used before the batteries need to be recharged or replaced.

These and other limitations of the prior art will become apparent to those of skill in the art upon a reading of the following descriptions and a study of the several figures of the drawing.

SUMMARY

In an embodiment, set forth by way of example and not limitation, a circuit for 3D active eyewear includes: a front-end circuit having a front-end signal input and a front-end signal output; a receiver stage having a receiver signal input coupled to the front-end signal output and having a receiver signal output; and a controller having a controller input coupled to the receiver signal output and having a left lens control signal output and a right lens control signal output.

In another embodiment, set forth by way of example and not limitation, a front-end circuit includes a common base input device having an emitter signal input, a base coupled to a first reference voltage, and a collector signal output; a first current mirror having a first current mirror input coupled to the collector signal output and having a first current mirror output which is a first multiple of the first current mirror input; and a second current mirror having a second current mirror input coupled to the first current mirror output and having a second current mirror output which is a second multiple of the second current mirror input.

In another embodiment, set forth by way of example and not limitation, the first current mirror includes a cancellation signal output and further includes a voltage drop resistor coupled to the cancellation signal output. An operational transimpedance amplifier (OTA) has inputs coupled to the voltage drop resistor and to a reference voltage, and an output which controls a variable current source connected to the emitter signal input. A compensating impedance is also coupled to the output of the OTA output.

An advantage of example embodiments is that the current drain of a front-end circuit is reduced. A further advantage of example embodiments is that a front-end circuit is provided with relatively few components and which is therefore low in noise generation. Another advantage of example embodiments is that a front-end circuit for a receiver stage provides a current output signal for a current mode variable gain amplifier of the receiver stage. Another advantage of example embodiments is that a front-end circuit is provided with good DC and low frequency interference rejection due to the feedback of a cancellation signal. A still further advantage of example embodiments is that a front-end circuit is provided with good high frequency interference rejection.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 3 is a block diagram of an example circuit for 3D active eyewear; and

FIG. 4 is a schematic of a front-end circuit for 3D active eyewear.

DETAILED DESCRIPTION OF EXAMPLE EMBODIMENTS

Figure 1:
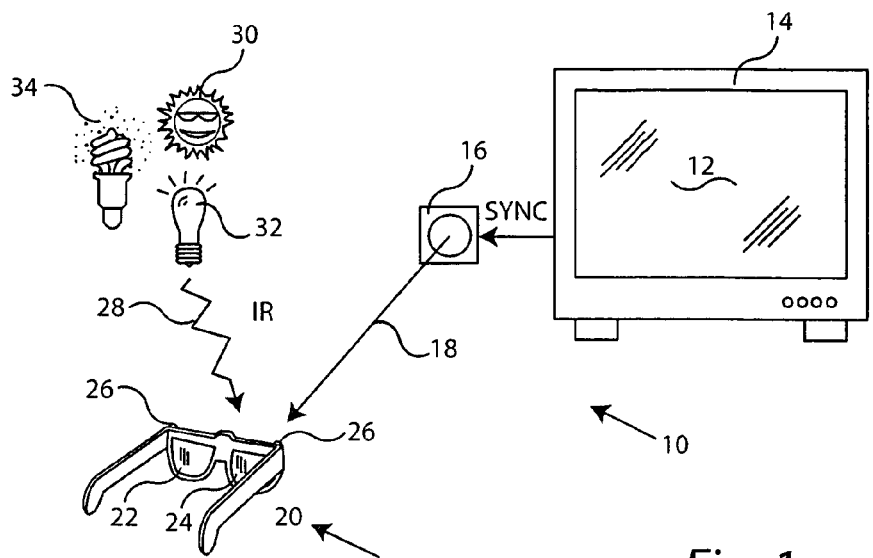
FIG. 1 is an illustration of an alternate-frame sequencing system 10 in accordance with the prior art.
Figure 2:
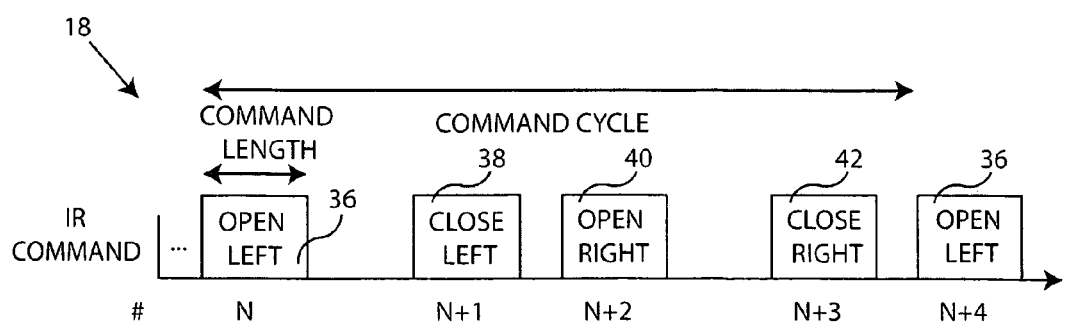
FIG. 2 is a diagram of an example I/R synchronization signal of the prior art.

FIGS. 1 and 2 were described with reference to the prior art. In FIG. 3, a block diagram of a circuit 44 for 3D active eyewear, set forth by way of example and not limitation, includes a front-end circuit 46, a receiver stage 48 and a controller 50. In example embodiments, front-end circuit 46, receiver stage 48 and controller 50 may be a part of an a packaged integrated circuit device of the type including one or more semiconductor chips or dice, an insulating package, and a plurality of conductive leads or contacts providing electrical connections to the semiconductor chip(s).

In FIG. 3, example front-end circuit 46 includes signal path circuitry 52 and cancellation loop circuitry 54. Coupled to the front-end circuit 46 are a photodiode 56 and a compensating impedance 58. In alternate embodiments, either one or both of photodiode 56 and compensating impedance 58 may form a part of the front-end circuit 46. In this example, the signal path circuitry 52 is represented by a current amplifier $I_{AMP}$ and the cancellation loop circuitry 54 is represented by a low pass filter 60 (functionally including compensating impedance 58 in this example) and a variable current source 62. Example embodiments of the signal path circuitry and the cancellation loop circuitry will be discussed in greater detail subsequently with reference to FIG. 4.

With continuing reference to FIG. 3, receiver stage 48 includes a variable gain current amplifier ($I_{GVA}$) 64, a voltage amplifier ($V_{AMP}$) 66, a channel filter 68, a demodulator 70 (e.g. an active rectifier to rectify command pulses), a low pass filter 72 which helps to reconstruct the width of the command pulses, an A/D converter 74 (e.g. a "slicer" including a comparator to a d.c. average reference) to digitize the output of the receiver stage 48, and an analog automatic gain control (AGC) 76 to extend the dynamic range of the receiver stage (e.g. 100 dB). The AGC 76 operates on the peak of the analog output signal of the low pass filter 72 on a line 78 to provide an automatic gain control signal for $I_{GVA}$ 64, as will be appreciated by those of skill in the art. The A/D converter 74 converts the analog signal on line 78 to a digital signal on line 80, as will also be appreciated by those of skill in the art.

Controller 50, in this non-limiting example, includes a command processor 82, a master controller 84 and shutter switching circuits 86 producing a left lens control signal 88 and a right lens control signal 90. Command processor 82 receives digital output signal of the receiver stage 48 on line 80 and decodes the signal to develop a sequence of commands on a line 92. Master controller 84 operates on the sequence of commands developed by the command processor 82 and controls the shutter switching circuits 86 (e.g. power switches) to open and close the lenses of the active eyewear in the proper sequence and with the proper timing.

In this example embodiment, command processor 82 and master controller 84 are illustrated as two logical functional blocks. This allows command processor 82 and master controller 84 to be implemented in different technologies. By way of non-limiting example, command processor 82 can be implemented by a state machine while master controller can be implemented with a microprocessor or micro controller. In alternate example embodiments, the logical functions of command processor 82 and master controller 84 can be provided in fewer or more functional blocks. By way of non-limiting example, the functions of both the command processor 82 and the master controller 84 could be performed on a single microprocessor.

FIG. 4 is a schematic, set forth by way of example and not limitation, of a front-end circuit 46', including example signal path circuitry 52' and cancellation loop circuitry 54'. Also shown are photodiode 56 and compensating impedance 58'. In this example embodiment, compensating impedance 58' includes the series connection of a capacitor 94 and a resistor 96.

Signal path circuitry 52', in this non-limiting example, includes a common base input device 98, a first current mirror 100 and a second current mirror 102. In this example, common base input device 98 comprises a NPN bipolar transistor having its emitter coupled to the cathode of photodiode 56 at an emitter signal input node 99, its base coupled to a reference voltage 104 and its collector coupled to current mirror 100.

As will be appreciated by those of skill in the art, common base input device 98 is configured as a common-base amplifier and serves as a current buffer and sets the impedance presented to the photodiode 56. In this common base configuration example, the NPN bipolar transistors' emitter serves as an emitter signal input and its collector as a collector signal output In alternate embodiments, the common-base input device 98 can be implemented in MOS technology. As used and claimed herein, in embodiments where the common-base input device 98 is implemented with alternate technologies such as MOS, JFET etc., the term "base" shall mean "gate", the term "emitter" shall mean "source" and the term "collector" shall mean "drain." In other alternate embodiments, the polarities of the signals and components can be reversed, as will be appreciated by those of skill in the art. For example, the common-base input device 98 can be implemented with a PNP bipolar transistor or with a PMOS transistor and the photodiode 56 can be coupled to the supply voltage rather than ground. In still further alternate embodiments, the current mirrors can be implemented with other alternate technologies, for example, bipolar transistors, as will be appreciated by those of skill in the art.

Preferably, common base input device 98 is biased so that its emitter impedance forms a pole with the capacitance of photodiode 56 to reject high frequency interference, such as that produced by fluorescent light 34 of FIG. 1. As will be appreciated by those of skill in the art, $1/g_m$ sets the input impedance for the common base input device 98, where $g_m$ is its transconductance. By way of non-limiting example, in an embodiment the input impedance is set such that, in conjunction with the photodiode capacitance, the low-pass cutoff occurs at about 100 kHz.

First current mirror 100, in this non-limiting example, includes a first PMOS transistor 106 and a second PMOS transistor 108 which are both coupled to a first current mirror input node 110. PMOS transistor 108 provides a first current mirror output on a line 112. As will be appreciated by those of skill in the art, the first current mirror 100 can be configured to have a current multiplying effect whereby the current flowing from the first current mirror output is a first multiple of the current flowing into the first current mirror input. By way of non-limiting example, the first multiple can be four, such that the current multiplication or amplification is 4:1.

Second current mirror 102, in this non-limiting example, includes a first NMOS transistor 114 and a second NMOS transistor 116 which are both coupled to a second mirror input node 118. The first current mirror output on line 112 is also coupled to the second mirror input node 118. NMOS transistor 116 provides a second current mirror output on a line 120 which can be coupled, for example, to $I_{VGA}$ 64 of FIG. 3. As was the case with the first current mirror 100, the second current mirror 102 can be configured to have a current multiplying effect whereby the current flowing from the second current mirror output is a second multiple of the current flowing into the second current mirror input. In an example embodiment, the first multiple of the first current mirror 100 can be the same as the second multiple of the second current mirror 102. For example, both the first multiple and the second multiple can be four such that each current mirror provides a current multiplication or amplification of 4:1.

Since, in this non-limiting example, the output of the first current mirror 100 is coupled to the input of the second current mirror 102, the output of the second current mirror 102 is the product of the first multiple and the second multiple times the input of the first current mirror 100. In the current example where the first multiple and the second multiple are both four, the current output on line 120 is 4×4=16 times the input current at node 110.

Cancellation loop circuitry 54', in this non-limiting example, includes a third PMOS transistor 122 which is coupled to the first current mirror 100 to provide a cancellation signal output at a node 124. In this example, the cancellation loop circuitry 54' also includes a voltage drop resistor 126 coupled to the node 124, an operational transimpedance amplifier (OTA) 128 having a first (positive) input coupled to node 124, a second reference voltage 130 coupled to a second (negative) input of OTA 128, and a variable current source 132 having a control input coupled to an OTA output at a node 134. As will be appreciated by those of skill in the art, an OTA is a type of operational amplifier (Op AMP) having a voltage input and a current output. Variable current source 132 has a current source output 136 which is coupled to emitter signal input node 99.

As noted previously, photodiode 56, which is responsive in this example to both the I/R synchronization signal 18 and to I/R interference 28 (see also FIG. 1), and compensating impedance 58' can be provided externally to front-end circuit 46' as shown. Alternatively, either or both of photodiode 56 and compensating impedance 58' can be integrated with the circuitry of front-end circuit 46 on, for example, a semiconductor chip.

Cancellation loop circuitry 54', along with the compensating impedance 58', serves to substantially reduce ("cancel") the effects of for example, the low frequency portion of I/R interference 28 from, for example, sunlight 30 or an incandescent light bulb 32 as shown in FIG. 1. This is accomplished by comparing the voltage at node 124 developed by the cancellation signal produced by the third PMOS transistor 122 flowing through the voltage drop resistor 126 against the second reference voltage 130. If the voltage at node 124 is greater than the second reference voltage 130, the current at node 134 will start to charge up the capacitor 94 of the compensating impedance 58'. This, will result in the increasing the amount of current provided by the variable current source 132 to the emitter input node 99 creating a nulling effect with respect to the current produced by the photodiode 56 due to I/R interference 28 from, for example, sunlight 30 or an incandescent light bulb 32 as shown in FIG. 1.

In this example, the compensating impedance 58' is provided "off chip" and includes the series connection of a capacitor and a resistor, where the capacitor integrates the OTA output current to provide a pole at d.c. and the resistor adds a zero in the feedback response to improve phase margin at high open loop gain operation. As will be appreciated by those of skill in the art, there are other ways of providing compensating impedance to create a desired filtering response, such as forming a lead compensation zero to enhance stability in high open loop gain operation, by using various combinations of reactive and non-reactive components. High open loop gain circuits are desirable for nulling or cancelling error signals such as low frequency interference signals.

There are several advantages to providing the compensating impedance 58' off chip. First, the capacitor 94 tends to be less expensive when it is provided off chip rather than on chip. Also, by providing the capacitor 94 and resistor 96 off chip the compensating impedance Z can be changed more easily to change the frequency response of the cancellation loop circuitry 54'. For example, additional poles and/or zeros can be added to the frequency response providing better attenuation for selected frequencies.

In operation, if the current flowing out of node 99 from the photodiode 56 is greater than the current being provided by variable current source 132, then the current flowing out of PMOS transistor 122 into node 124 will increase, increasing the voltage at the positive (non-inverting) input of OTA 128. If the voltage at node 124 exceeds set point voltage of the second voltage reference 130, then current from the OTA output will flow through resistor 96 and into capacitor 94 which will charge up and increase the voltage at the control input of variable current source 132. This causes the output current of variable current source 132 to increase, nulling the interference effects at the emitter signal input node 99.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:
1. A circuit for 3D active eyewear comprising:
 a front-end circuit having a front-end signal input and a front-end signal output, the front end circuit including a common base input device having an emitter signal input, a base coupled to a first reference voltage, and a collector signal output and a current mirror having a current mirror input coupled to said collector signal output and having a current mirror output which is a multiple of said current mirror input;

a receiver stage having a receiver signal input coupled to said front-end signal output and having a receiver signal output; and a controller having a controller input coupled to said receiver signal output and having a left lens control signal output and a right lens control signal output.

2. A circuit for 3D active eyewear as recited in claim 1 wherein said receiver stage includes an analog demodulator section in series with an analog-to-digital converter (ADC).

3. A circuit for 3D active eyewear as recited in claim 2 wherein said analog demodulator section includes automatic gain control (AGC).

4. A circuit for 3D active eyewear as recited in claim 3 wherein said controller includes a command processor coupled to said controller input, a master controller coupled to an output of said command processor, and shutter switching circuits coupled to an output of said master controller.

5. A circuit for 3D active eyewear as recited in claim 1 wherein said front-end circuit, said receiver stage and said controller form a part of a packaged integrated circuit device.

6. A circuit for 3D active eyewear as recited in claim 1 wherein said current mirror is a first current mirror having a first current mirror input coupled to said collector signal output and having a first current mirror output which is a first multiple of said first current mirror input, and further comprising:

a second current mirror having a second current mirror input coupled to said first current mirror output and having a second current mirror output which is a second multiple of said second current mirror input.

7. A circuit for 3D active eyewear as recited in claim 6 wherein said first current mirror includes a cancellation signal output and further comprising a voltage drop resistor coupled to said cancellation signal output.

8. A circuit for 3D active eyewear as recited in claim 7 further comprising an operational transimpedance amplifier (OTA) having a first OTA input coupled to said voltage drop resistor, a second OTA input coupled to a second reference voltage, and an OTA output.

9. A circuit for 3D active eyewear as recited in claim 8 further comprising a variable current source having a control input coupled to said OTA output and having a current source output coupled to said emitter signal input.

10. A circuit for 3D active eyewear as recited in claim 9 further comprising a compensating impedance coupled to said OTA output.

11. A circuit for 3D active eyewear as recited in claim 10 wherein said compensating impedance comprises a capacitor in series with a resistor.

12. A circuit for 3D active eyewear as recited in claim 10 wherein said compensating impedance forms a lead compensation zero to enhance stability in high open loop gain operation.

13. A circuit for 3D active eyewear as recited in claim 9 further comprising a photodiode coupled to said emitter signal input.

14. A circuit for 3D active eyewear as recited in claim 9 wherein said common base input device, said first current mirror, said second current mirror, said voltage drop resistor, said OTA and said variable current source form a part of a packaged integrated circuit device having a plurality of electrical leads.

15. A circuit for 3D active eyewear as recited in claim 14 further comprising a photodiode coupled to at least one of said electrical leads such that said photodiode is coupled to said emitter signal input of said common base input device.

16. A circuit for 3D active eyewear as recited in claim 15 wherein said first reference voltage sets the reverse bias of said photodiode.

17. A circuit for 3D active eyewear as recited in claim 14 further comprising a compensating impedance coupled to at least one of said electrical leads such that said compensating impedance is coupled to said OTA output.

18. A circuit for 3D active eyewear as recited in claim 17 wherein said compensating impedance comprises a series connection of a resistor and a capacitor.

19. A circuit for 3D active eyewear as recited in claim 6 wherein said first multiple and said second multiple are the same.

* * * * *